United States Patent
Seong

Patent Number: 6,081,497
Date of Patent: Jun. 27, 2000

[54] OPTICAL PICKUP HAVING COMPATIBILITY WITH A DIGITAL VERSATILE DISK AND A COMPACT DISK-RECORDABLE

[75] Inventor: Pyong-Yong Seong, Seoul, Rep. of Korea

[73] Assignee: Samsung Electronics, Co., Ltd., Suwon, Rep. of Korea

[21] Appl. No.: 09/008,315

[22] Filed: Jan. 20, 1998

[30] Foreign Application Priority Data

Jan. 20, 1997 [KR] Rep. of Korea .......................... 97-1434

[51] Int. Cl.⁷ ...................................................... G11B 7/00
[52] U.S. Cl. ........................ 369/112; 369/110; 369/49.14
[58] Field of Search ............................. 369/58, 112, 110, 369/111, 109, 100, 103, 13, 93, 94, 44.37, 44.38, 44.14, 44.12, 106

[56] References Cited

U.S. PATENT DOCUMENTS 5,671,206   9/1997   Choi ................................. 369/44.37 X

FOREIGN PATENT DOCUMENTS

8-55363    2/1996   Japan .
8-329518   12/1996  Japan .

*Primary Examiner*—Muhammad Edun
*Attorney, Agent, or Firm*—Staas & Halsey LLP

[57] ABSTRACT

An optical pickup is used for two kinds of disks, each of which uses a different wavelength of light. The optical pickup includes first and second light sources for individually emitting first and second light beams which have a respectively different wavelength from each other and are identically linearly polarized, a polarizing beam splitter, a quarter-wave plate and a total reflection element. The polarizing beam splitter, the quarterwave plate and the total reflection element are arranged so that a first optical path is formed in which the first light beam emitted from the first light source proceeds toward the loaded disk via the polarizing beam splitter and the objective lens and the first light beam reflected from the loaded disk proceeds toward the first light source via the objective lens and the polarizing beam splitter, and so that a second optical path is formed in which the second light beam emitted from the second light source proceeds toward the loaded disk via the polarizing beam splitter, the quarter-wave plate, the total reflection element, the quarter-wave plate, the polarizing beam splitter and the objective lens and the second light beam reflected from the loaded disk proceeds toward the second light source via the objective lens, the polarizing beam splitter, the quarter-wave plate, the total reflection element, the quarter-wave plate and the polarizing beam splitter. Thus, the optical pickup can be made compact and at a low cost. Also, the polarizing beam splitter, the quarter-wave plate and the total reflection element have respectively high light utilization efficiencies, which are appropriate for a recording and reproducing optical pickup.

39 Claims, 5 Drawing Sheets

OPTICAL PICKUP HAVING COMPATIBILITY WITH A DIGITAL VERSATILE DISK AND A COMPACT DISK-RECORDABLE

BACKGROUND OF THE INVENTION

1. Field of the Invention

The present invention relates to an optical pickup having two light sources whose wavelengths differ from each other, and more particularly, to an optical pickup having two light sources and an objective lens.

2. Description of the Related Art

An optical pickup includes a laser diode, an objective lens and a photodetector, which is used for recording and reproducing information such as video, audio or data at high density. An optical disk used as a recording medium comprises a plastic or glass medium having a uniform thickness through which light is incident from a laser diode, and a signal recording surface which is located on the medium and on which information is recorded.

Recently commercialized digital video disks called digital versatile disks (DVDs) have a reduced substrate thickness of 0.6 mm but a high recording density, compared with an existing compact disk (CD) or a CD-recordable (CD-R) having a substrate thickness of 1.2 mm.

Optical pickups adopting various methods using the light beam whose wavelength is 650 nm have been proposed in order to make such DVDs compatible with the existing CD. There are an annular shielding method, a two-lens method, a hologram method and a liquid crystal shutter method as the proposed methods.

A CD-R has a reflection coefficient of 70% or more with respect to the light beam having a wavelength of 780 nm. The reflection coefficient is the same as that of the existing CD. However, a CD-R has a reflection coefficient which is lowered down to 10% or less with respect to the wavelength of 650 nm used for DVDs. As a result, the optical pickups using the above-described methods can be compatible with both a DVD and a CD, while it is impossible to make the above-described optical pickups be compatible with both a DVD and a CD-R.

To solve this problem, there have been proposed various techniques for constituting an optical pickup which can use both 780 nm wavelength light and 650 nm wavelength light. One of the proposed techniques uses two optical pickups which includes an objective lens and a photodetector. The other thereof uses an optical pickup including two light sources, an objective lens and a photodetector.

Since the first technique uses two optical pickups, it can be compatible with a DVD, a CD and a CD-R, but it increases manufacturing cost and makes it difficult to be miniaturized. The second technique integrates an objective lens and two light sources in an optical pickup. In such a combination, a number of optical components are needed. Consequently, it is difficult not only to reduce the number of components, but also to increase miniaturization.

SUMMARY OF THE INVENTION

To solve the above problems, it is an object of the present invention to provide an optical pickup having an improved structure which can be compatible with a DVD, a CD and a CD-R.

Additional objects and advantages of the invention will be set forth in part in the description which follows and, in part, will be obvious from the description, or may be learned by practice of the invention.

To accomplish the above and other objects of the present invention, there is provided an optical pickup compatible with disks using light beams having different wavelengths, the optical pickup comprising:

first and second light sources for individually emitting first and second light beams which have different wavelengths and are identically linearly polarized, wherein one of the first and second light sources emits light according to a loaded disk; an objective lens; a polarizing beam splitter; a quarter-wave plate; and a total reflection element, wherein the polarizing beam splitter, the quarter-wave plate and the total reflection element are arranged so that a first optical path is formed in which the first light beam emitted from the first light beam source proceeds toward a loaded disk via the polarizing beam splitter and the objective lens and the first light beam reflected from the loaded disk proceeds toward the first light source via the objective lens and the polarizing beam splitter, and so that a second optical path is formed in which the second light beam emitted from the second light source proceeds toward a loaded disk via the polarizing beam splitter, the quarter-wave plate, the total reflection element, the quarter-wave plate, the polarizing beam splitter and the objective lens and the second light beam reflected from the loaded disk proceeds toward the second light source via the objective lens, the polarizing beam splitter, the quarter-wave plate, the total reflection element, the quarter-wave plate and the polarizing beam splitter.

According to another aspect of the present invention, there is provided an optical pickup compatible with disks using light beams having different wavelengths, the optical pickup comprising:

first and second light sources for individually emitting first and second light beams which have different wavelengths and are identically linearly polarized, wherein one of the first and second light sources emits light according to a loaded disk; an objective lens; and a photocoupler, wherein the photocoupler reflects the first light beam so that the first light beam emitted from the first light source proceeds toward the disk via the objective lens and so that the first light beam reflected from the disk and passed through the objective lens proceeds toward the first light source, and changes the optical path of the second light beam so that the second light beam emitted from the second light source proceeds toward the disk via the objective lens and so that the second light beam reflected from the disk and passed through the objective lens proceeds toward the second light source.

BRIEF DESCRIPTION OF THE DRAWINGS

The preferred embodiments are described with reference to the drawings, wherein.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1A:
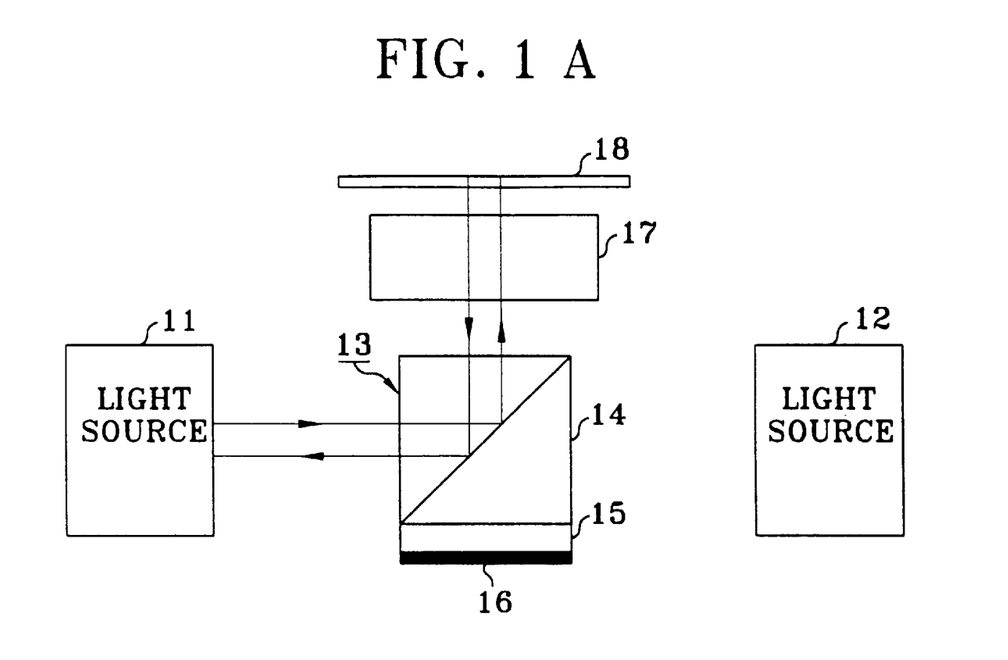
FIGS. 1A and 1B are views for explaining an optical system of an optical pickup according to a first embodiment of the present invention.
Figure 1B:
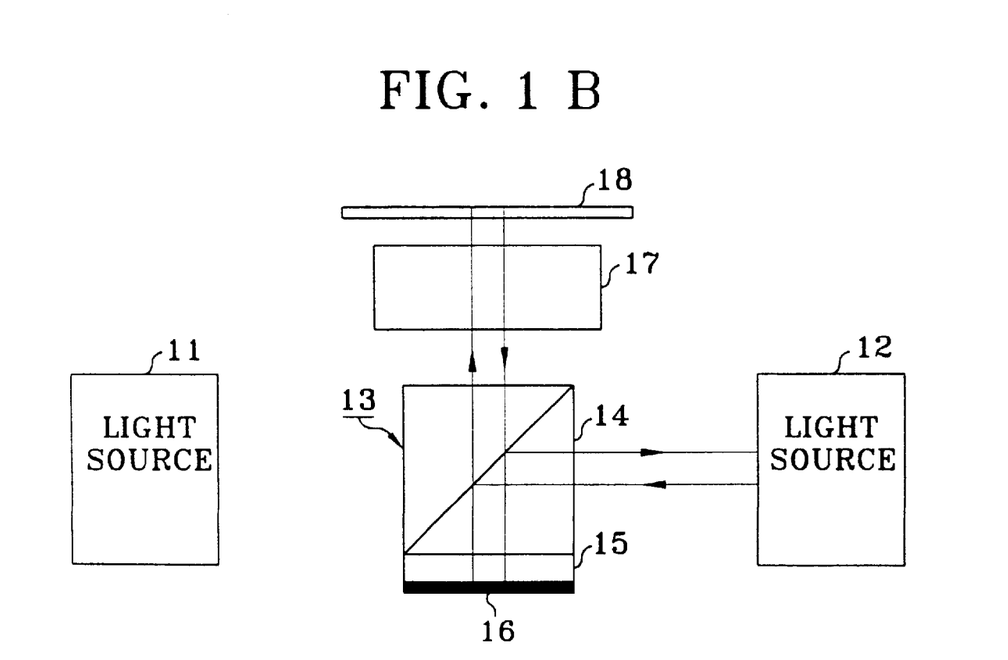

FIGS. 1A and 1B schematically show an optical system of an optical pickup according to a first embodiment of the present invention, in which optical paths formed by the optical system are slightly exaggerated for easy understanding. In FIGS. 1A and 1B, light sources 11 and 12 generate linearly polarized first and second light beams which have different wavelengths from one another and the same S-polarization component. Here, the S-polarization component is defined based on a polarizing beam splitter 14 to be described later. A photocoupler 13 includes a polarizing beam splitter 14, a quarter-wave plate 15 and a total reflection element 16. The photocoupler 13 shown in FIGS. 1A and 1B is a single module being integrated with the polarizing beam splitter 14, the quarter-wave plate 15 and the total reflection element 16. The photocoupler 13 which makes light paths of first and second light beams differ from each other, transmits the first and second light beams incident from the light sources 11 and 12, respectively, to an objective lens 17. The objective lens 17 focuses the first or second light beam incident from the photocoupler 13 on a signal recording surface of a corresponding disk 18. The polarizing beam splitter 14 which has an optical characteristic for transmitting or reflecting linearly polarized light, is constructed and arranged so that the first light beam incident from the light source 11 is reflected toward the objective lens and the second light beam incident from the light source 12 is reflected toward the quarter-wave plate 15. The quarter-wave plate 15 is formed on the surface of the polarizing beam splitter 14 perpendicular to an optical axis of the objective lens 17, and the total reflection element 16 is formed on the surface of the quarter-wave plate 15, in sequence. The total reflection element 16 is made of a material having a total reflection characteristic and is formed on the surface of the quarter-wave plate 15 by means of a coating and the like.

Referring to FIG. 1A showing the light path of the first light beam generated by the light source 11, the first light beam incident from the light source 11 to the photocoupler 13 has an S-polarization component and is reflected from the polarizing beam splitter 14. The reflected first light beam is incident to the disk 18 by the objective lens 17. The first light beam reflected from the disk 18 passes again through the objective lens 17, and then is reflected from the polarizing beam splitter 14. The reflected first light beam is transmitted toward the light source 11.

Referring to FIG. 1B showing the light path of the second light beam generated by the light source 12, the second light beam incident from the light source 12 to the polarizing beam splitter 14 is linearly polarized, having an S-polarization component, and is reflected from the polarizing beam splitter 14. The reflected second light beam is incident to the quarter-wave plate 15. The quarter-wave plate 15 phase-shifts the incident second light beam by $\pi/2$. As a result, the linearly polarized second light beam is changed into a circularly polarized light. The circularly polarized second light beam is totally reflected from the total reflection element 16. The quarter-wave plate 15 phase-shifts the totally reflected second light beam by $\pi/2$ again. As a result, the second light beam is changed into a linearly polarized light having a P-polarization component from the circularly polarized light. The second light beam having a P- polarization component incident from the quarter-wave plate 15 passes through the polarizing beam splitter 14. The second light beam passing through the polarizing beam splitter 14 passes through the objective lens 17 and then is incident to the disk 18. The second light beam reflected from the disk 18 passes through the objective lens 17 again and is incident to the photocoupler 13. Since the second light beam incident from the objective lens to the photocoupler 13 still has the P-polarization component, the polarizing beam splitter 14 transmits the incident second light beam toward the quarter-wave plate 15. The quarter-wave plate 15 phase-shifts the incident second light beam and changes it into a circularly polarized light beam. The circularly polarized second light beam is reflected from the total reflection element 16 and incident back to the quarter-wave plate 15. The quarterwave plate 15 changes the incident second light beam into a linearly polarized light beam. A resultantly obtained second light beam having an S-polarization component is incident to the polarizing beam splitter 14. The polarizing beam splitter 14 reflects the second light beam incident from the quarter-wave plate 15, and the second light beam reflected from the polarizing beam splitter 14 proceeds toward the light source 12.

Figure 2:
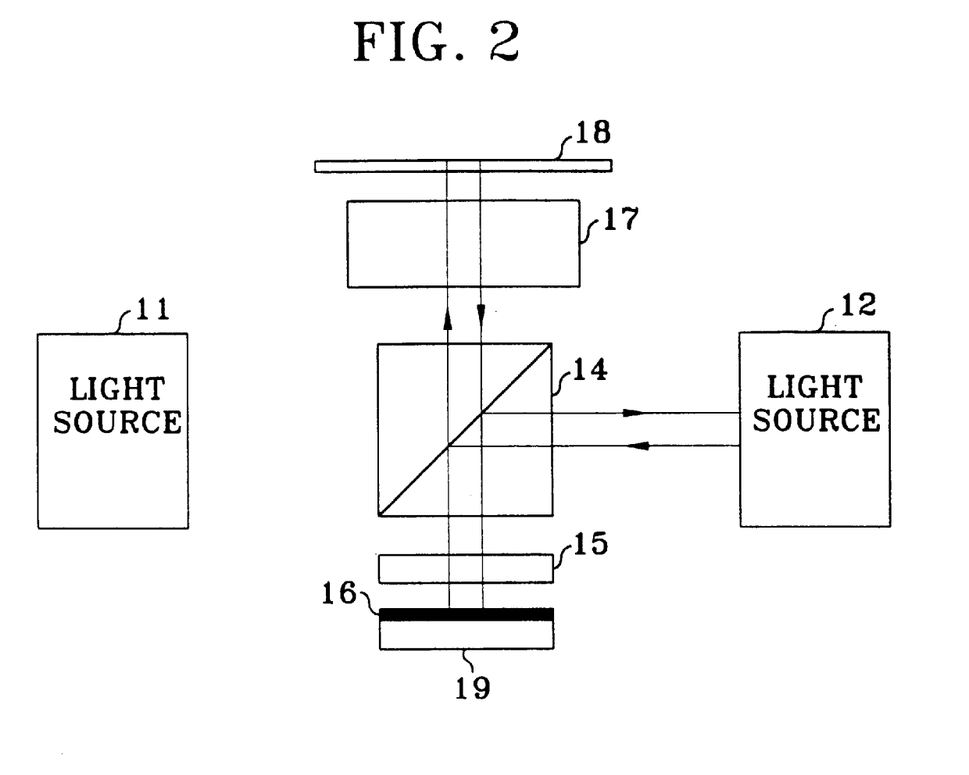
FIG. 2 is a view for explaining an optical system of an optical pickup according to a second embodiment of the present invention, different from the optical system of FIGS. 1A and 1B.

FIG. 2 shows an example in which the photocoupler 13 shown in FIGS. 1A and 1B is separated into a polarizing beam splitter 14, a quarter-wave plate 15 and a total reflection element 16. The polarizing beam splitter 14 shown in FIG. 2 is disposed in the same position as that in the optical system of FIGS. 1A and 1B. The quarter-wave plate 15 and the total reflection element 16 are disposed perpendicularly to the direction of the optical axis of an objective lens 17. The quarter-wave plate 15 is disposed at a location spaced apart from the polarizing beam splitter 14. Then, the total reflection element 16 is disposed at a location spaced apart from the quarter-wave plate 15. The total reflection element 16 is formed by coating a total reflection material on the surface of a flat substrate 19 facing the quarter-wave plate 15. The quarter-wave plate 14 and the total reflection element 16 have the same optical characteristics as those described with reference to FIGS. 1A and 1B. The optical system shown in FIG. 2 has the same optical characteristic as that described with reference to FIGS. 1A and 1B, whose detailed description is omitted accordingly.

Figure 3:
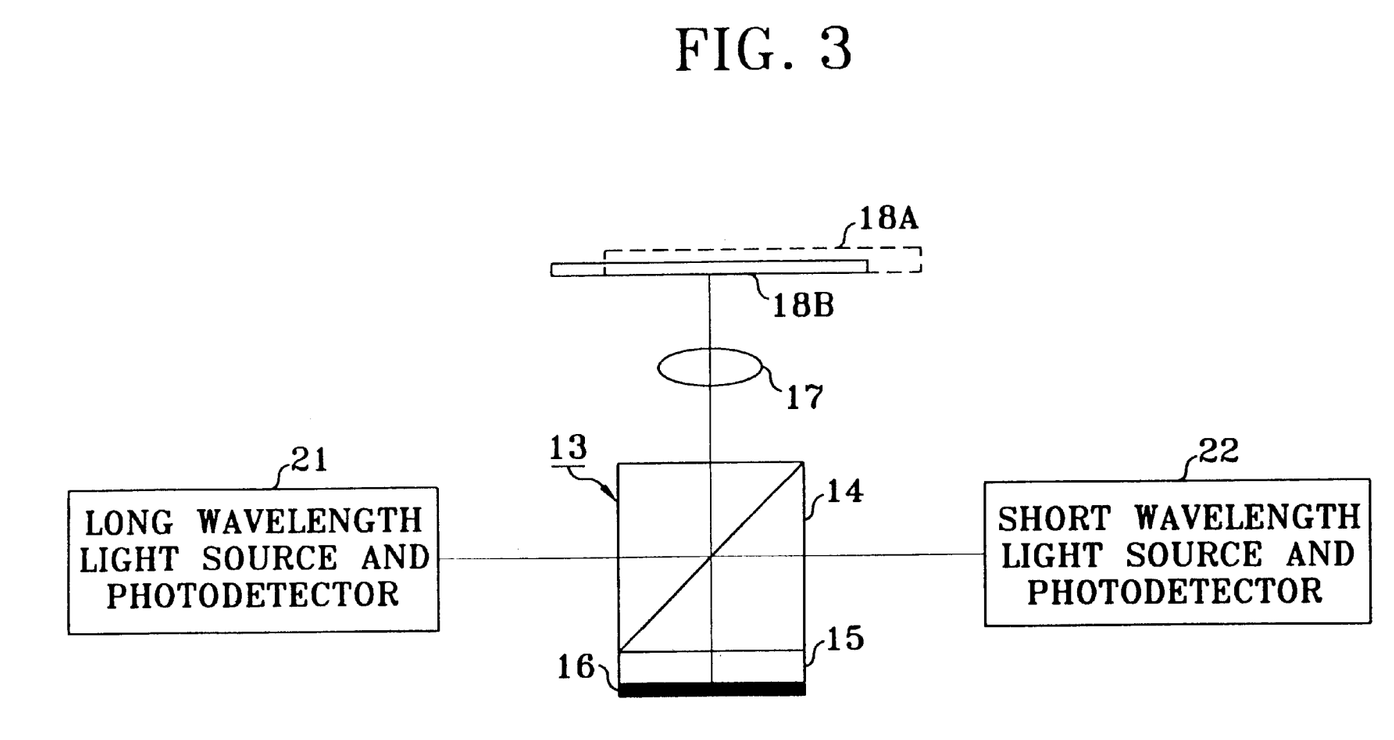
FIG. 3 is a view showing an optical pickup in which light sources and photodetectors which are used for each of two light beams having different wavelengths are integrally incorporated.
Figure 4:
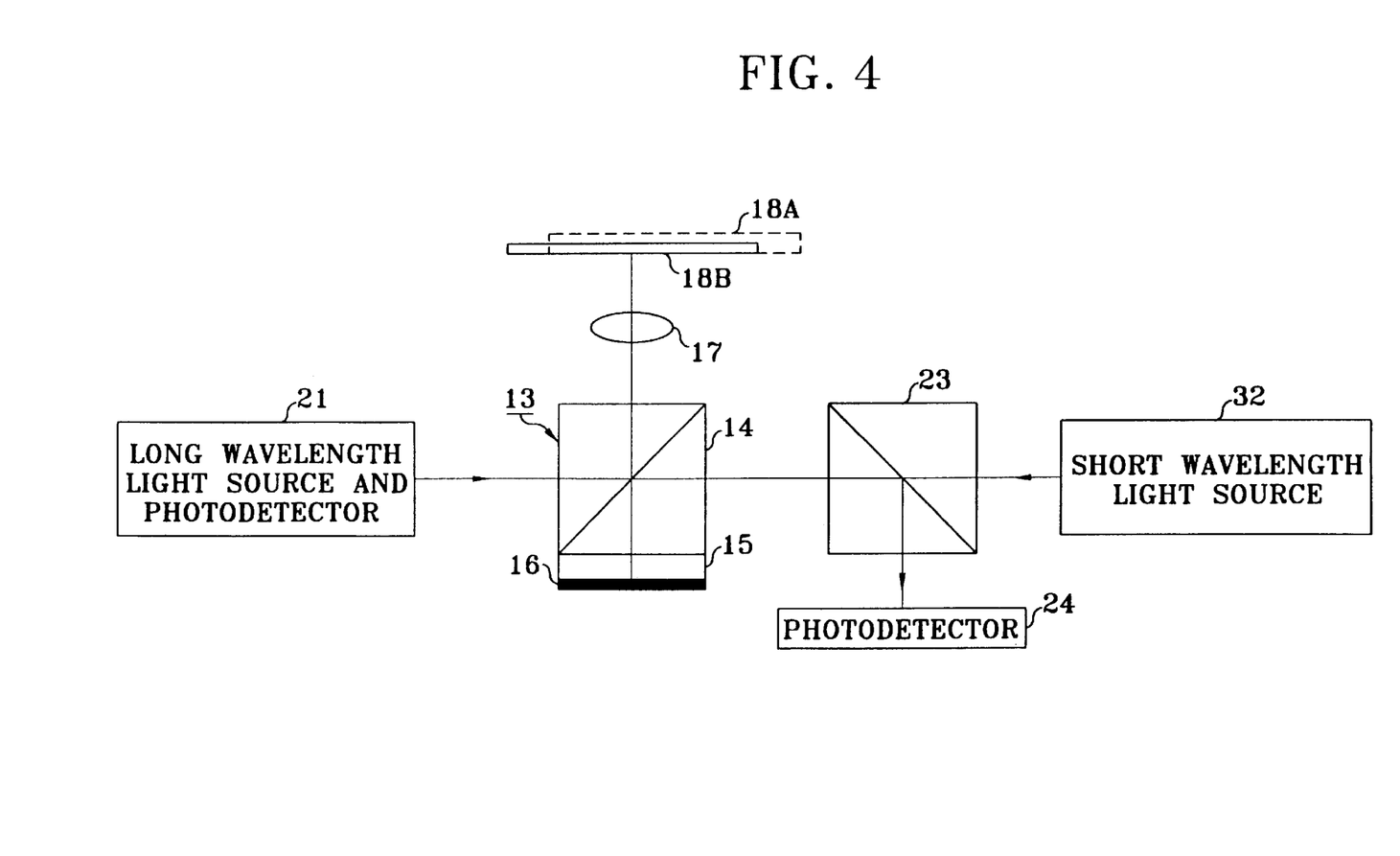
FIG. 4 is a view showing an optical pickup in which a light source and a photodetector which are used for a single particular light beam are integrally incorporated.
Figure 5:
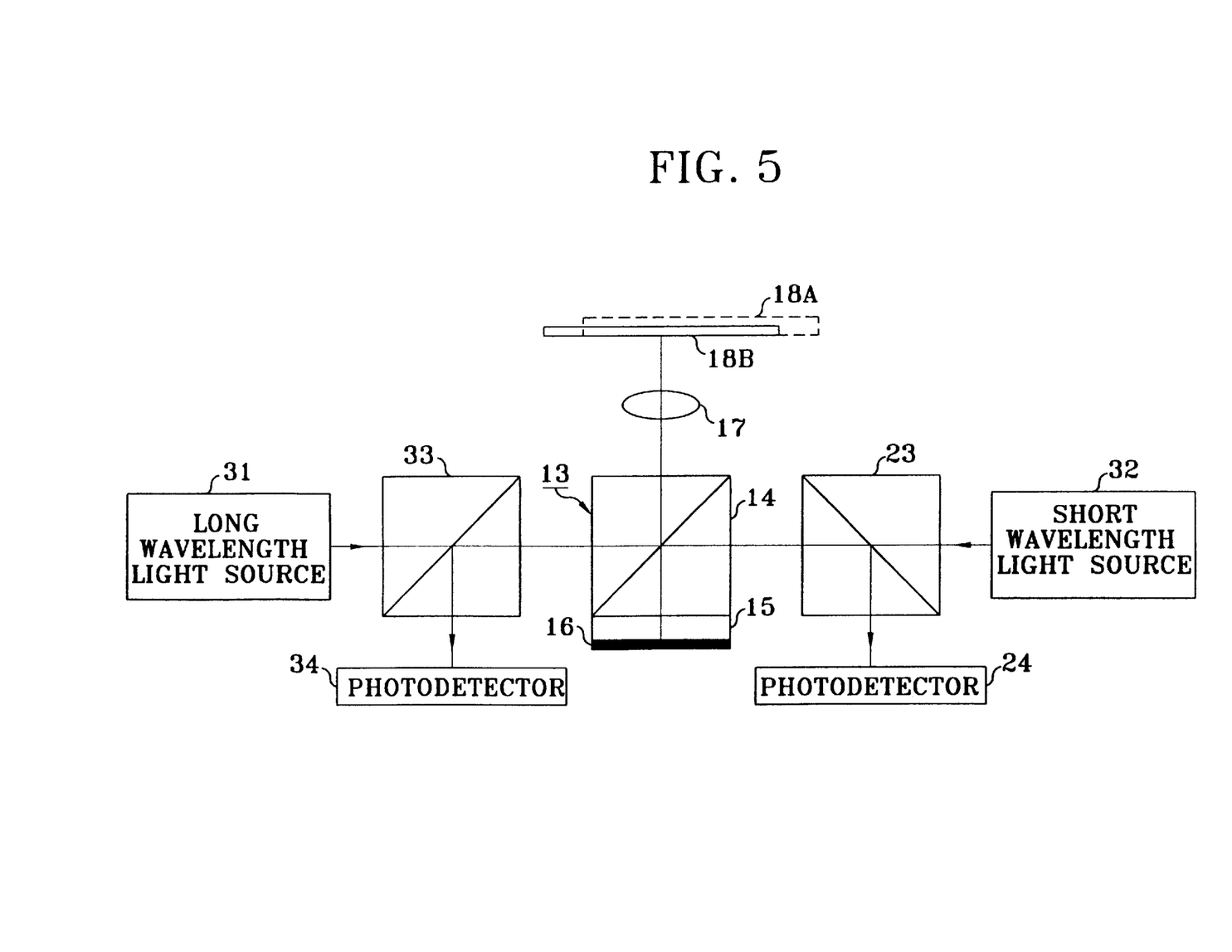
FIG. 5 is a view showing an optical pickup in which light sources and photodetectors are separated.

FIGS. 3 through 5 show optical pickups adopting the optical system described with reference to FIGS. 1A and 1B. In the optical system shown in FIG. 3, a long wavelength light source and photodetector 21 has a structure having a single module into which a light source generating the laser light of a long wavelength and an optical pickup corresponding to the light source are integrated. Likewise, a short-wavelength light source and photodetector 22 has a structure having a single module into which a light source generating laser light of a short wavelength and an optical pickup corresponding to the light source are integrated. Since the function of the photocoupler 13 is the same that described with reference to FIGS. 1A and 1B, the detailed description thereof is omitted.

In the case that an optical disk 18A having a thickness of 1.2 mm such as a CD and a CD-R is loaded, the long wavelength light source and photodetector 21 is used for the laser light of wavelength of 780 nm. The light emitted from the long wavelength light source and photodetector 21 is incident to an objective lens 17 by the photocoupler 13, and focused on the signal recording surface (not shown) of the optical disk 18A by the objective lens 17. The light reflected from the signal recording surface of the optical disk 18A passes through the objective lens 17 and the photocoupler 13, and then is incident to the long wavelength light source and photodetector 21.

In the case that an optical disk 18B having a thickness of 0.6 mm such as a DVD is loaded, the short wavelength light source and photodetector 22 is used for laser light of wavelength of 650 nm. The light emitted from the short wavelength light source and photodetector 22 is incident to the objective lens 17 by the photocoupler 13. The objective lens 17 focuses the incident light on the signal recording surface (not shown) of the optical disk 18B. The light reflected from the optical disk 18B passes through the objective lens 17 and the photocoupler 13 again, and then is incident to the short wavelength light source and photodetector 22.

FIG. 4 shows an optical system of an optical pickup in which a short wavelength light source 32, a beam splitter 23 and a photodetector 24 are used, instead of the short wavelength light source and photodetector 22 shown in FIG. 3. The beam splitter 23 is constructed and arranged so that the light incident from the short wavelength light source 32 is transmitted and the light incident from the photocoupler 13 is reflected. The light emitted from the long wavelength light source and photodetector 21 forms the same light path as that described with reference to FIG. 3. The light emitted from the short wavelength light source 32 transmits the beam splitter 23 to then be incident to the photocoupler 13. The light incident from the photocoupler 13 to the beam splitter 23 is reflected from the beam splitter 23. The reflected light is incident to the photodetector 24.

An optical pickup shown in FIG. 5 uses a long wavelength light source 31, a beam splitter 33 and a photodetector 34, instead of the long wavelength light source and photodetector 21 shown in FIG. 4. The beam splitter 33 is constructed and arranged so that the light incident from the long wavelength light source 31 is transmitted and the light incident from the photocoupler 13 is reflected. Since the function of the beam splitter 33 is same as that of the beam splitter 23 described with reference to FIG. 4, the detailed description thereof is omitted.

The optical pickups shown in FIGS. 3 through 4 use the photocoupler 13 shown in FIGS. 1A and 1B as described above. The combination of the polarizing beam splitter 14, the quarter-wave plate 15 and the total reflection element 16 described with reference to FIG. 2 has the same optical characteristics as those of the photocoupler 13. Thus, one skilled in the art can fully understand an optical pickup in which the photocoupler 13 is replaced with the polarizing beam splitter 14, the quarter-wave plate 15 and the total reflection element 16.

As described above, an optical pickup according to the present invention uses a single photocoupler which has a high light utilization efficiency and is particularly advantageous to a recording and reproducing optical pickup, to alter the light paths of the light beams that are emitted from different light sources and have different wavelengths from one another. The photocoupler includes a small number of optical components, to thereby make the optical pickup compact and reduce costs.

While only certain embodiments of the invention have been specifically described herein, it will be apparent that numerous modifications may be made thereto without departing from the spirit and scope of the invention.

What is claimed is:

1. An optical pickup of an optical device and compatible with disks using light beams having different wavelengths, the optical pickup comprising:

first and second light sources to individually emit first and second light beams which have different wavelengths from one another and are identically linearly polarized, wherein one of the first and second light sources emits light according to a corresponding one of disks loaded in the optical device;

an objective lens;

a polarizing beam splitter;

a quarter-wave plate; and a total reflection element, wherein the polarizing beam splitter, the quarter-wave plate and the total reflection element are arranged so that a first optical path is formed in which the first light beam emitted from the first light source proceeds toward the corresponding loaded disk via the polarizing beam splitter and the objective lens and the first light beam reflected from the corresponding loaded disk proceeds toward the first light source via the objective lens and the polarizing beam splitter, and so that a second optical path is formed in which the second light beam emitted from the second light source proceeds toward the corresponding loaded disk via the polarizing beam splitter, the quarter-wave plate, the total reflection element, the quarterwave plate, the polarizing beam splitter and the objective lens and the second light beam reflected from the corresponding loaded disk proceeds toward the second light source via the objective lens, the polarizing beam splitter, the quarter-wave plate, the total reflection element, the quarter-wave plate and the polarizing beam splitter.

2. The optical pickup according to claim 1, wherein the polarizing beam splitter, the quarter-wave plate and the total reflection element are integrated into a single module.

3. The optical pickup according to claim 1, wherein the total reflection element comprises:

a substrate having a flat surface; and a material having a total reflection characteristic formed on the flat surface of the substrate, and facing the quarter-wave plate.

4. The optical pickup according to claim 1, wherein the total reflection element comprises a material having a total reflection characteristic and formed on the surface of the quarter-wave plate, to totally reflect the second light beam incident from the quarter-wave plate.

5. The optical pickup according to claim 1, further comprising a photodetector to detect the first light beam which is reflected from the corresponding loaded disk and then proceeds toward the first light source from the polarizing beam splitter.

6. The optical pickup according to claim 5, wherein the photodetector and the first light source are integrated into a single module.

7. The optical pickup according to claim 1, further comprising:

a beam splitter to transmit the first light beam proceeding toward the polarizing beam splitter from the first light source and reflecting the first light beam proceeding toward the first light source from the polarizing beam splitter; and a photodetector to receive the first light beam reflected from the beam splitter.

8. The optical pickup according to claim 1, further comprising a photodetector to detect the second light beam which is reflected by the corresponding loaded disk and then proceeds toward the second light source from the polarizing beam splitter.

9. The optical pickup according to claim 8, wherein the photodetector and the second light source are integrated into a single module.

10. The optical pickup according to claim 1, further comprising:
   a beam splitter positioned on the second optical path between the polarizing beam splitter and the second light source, to separate the second light beam proceeding toward the second light source from the polarizing beam splitter, from the second optical path formed between the second light source and the polarizing beam splitter; and
   a photodetector to receive the second light beam separated by the beam splitter.

11. The optical pickup according to claim 1, wherein the first light beam has a relatively longer wavelength than that of the second light beam.

12. The optical pickup according to claim 11, wherein the first light beam emitted from the first light source is used when the corresponding loaded disk is a CD-R, and the second light beam emitted from the second light source is used when the corresponding a loaded disk is a DVD.

13. An optical pickup of an optical device and compatible with disks using lights having different wavelengths, the optical pickup comprising:
   first and second light sources to individually emit first and second light beams which have different wavelengths from one another and are identically linearly polarized, wherein one of the first and second light sources emits light according to a corresponding one of the disks loaded in the optical device;
   an objective lens; and
   a photocoupler,
   wherein the photocoupler reflects the first light beam so that the first light beam emitted from the first light source proceeds toward the disk via the objective lens and so that the first light beam reflected from the disk and passed through the objective lens proceeds toward the first light source, and changes an optical path of the second light beam so that the second light beam emitted from the second light source proceeds toward the corresponding disk via the objective lens and so that the second light beam reflected from the corresponding disk and passed through the objective lens proceeds toward the second light source.

14. The optical pickup according to claim 13, wherein the photocoupler comprises a polarizing beam splitter, a quarter-wave plate and a total reflection element,
   wherein the polarizing beam splitter, the quarter-wave plate and the total reflection element are arranged so that the first light beam incident from the first light source to the polarizing beam splitter proceeds toward the disk via the objective lens, and so that the second light beam incident from the second light source to the polarizing beam splitter passes through the polarizing beam splitter and the quarter-wave plate in turn to then be incident toward the total reflection element.

15. The optical pickup according to claim 14, wherein the polarizing beam splitter, the quarter-wave plate and the total reflection element are integrated into a single module.

16. The optical pickup according to claim 14, wherein the total reflection element comprises:
   a substrate having a flat surface; and
   a material having a total reflection characteristic formed on the flat surface of the substrate, and facing the quarter-wave plate.

17. The optical pickup according to claim 14, wherein the total reflection element comprises a material having a total reflection characteristic and is formed on the surface of the quarter-wave plate opposite to the polarizing beam splitter.

18. The optical pickup according to claim 13, further comprising a photodetector to detect the first light beam which is reflected from the photocoupler and then proceeds toward the first light source.

19. The optical pickup according to claim 18, wherein the photodetector and the first light source are integrated into a single module.

20. The optical pickup according to claim 13, further comprising:
   a beam splitter to transmit the first light beam proceeding toward the photocoupler from the first light source and reflecting the first light beam proceeding toward the first light source from the photocoupler; and
   a photodetector to detect the first light beam reflected from the beam splitter.

21. The optical pickup according to claim 13, further comprising a photodetector to detect the second light beam which is reflected from the photocoupler and then proceeds toward the second light source.

22. The optical pickup according to claim 21, wherein the photodetector and the second light source are integrated into a single module.

23. The optical pickup according to claim 13, further comprising:
   a beam splitter to transmit the second light beam proceeding toward the photocoupler from the second light source and reflecting the second light beam proceeding toward the second light source from the photocoupler; and
   a photodetector to receive the second light beam reflected from the beam splitter.

24. The optical pickup according to claim 13, wherein the first light beam has a relatively longer wavelength than that of the second light beam.

25. The optical pickup according to claim 24, wherein the first light beam emitted from the first light source is used when the corresponding loaded disk is a CD-R, and the second light beam emitted from the second light source is used when the corresponding loaded disk is a DVD.

26. An optical pickup of an optical device compatible with disks of different types using light beams of different wavelengths, the optical pickup comprising:
   first and second light sources to respectively emit first and second light beams of different wavelengths from each another, wherein one of the first and second light sources emits light according to a type of disk loaded in the optical device, the first light source emitting the first light beam if the loaded disk is a first type, and the second light source emitting the second light beam if the loaded disk is a second type different from the first type;
   an objective lens; and
   a photocoupler to reflect the first light beam incident from the first light source in a first direction toward the first type disk via the objective lens, and to reflect the second light beam incident from the first light source in a second direction opposite the first direction, and reflect the reflected second light beam back in the first direction toward the second type disk via the objective lens.

27. The optical pickup as claimed in claim 26, wherein the photocoupler reflects the first light beam reflected from the first type disk toward the first light source, and reflects the second light beam reflected from the second type disk back in the first direction and reflects the second light beam reflected back in the first direction toward the second light source.

28. The optical pickup as claimed in claim 26, wherein the first and second light beams emitted from the respective first and second light sources are linearly polarized.

29. The optical pickup as claimed in claim 26, wherein the photocoupler comprises:
   a total reflection element;
   a quarter-wave plate; and
   a polarizing beam splitter;
   wherein the total reflection element, the quarter-wave plate, and the polarizing beam splitter are positioned in order in the first direction, wherein the polarizing beam splitter reflects the first light beam incident from the first light source in the first direction toward the first type disk via the objective lens, reflects the second light beam incident from the second light source in the second direction, the quarter-wave plate passes the second light beam reflected in the second direction, the total reflection element totally reflects the second light beam passed in the second direction through the quarter-wave plate back in the first direction, the quarter-wave plate and the polarizing beam splitter passing the totally reflected second light beam in the first direction toward the second type disk.

30. The optical pickup as claimed in claim 29, wherein a first surface of the quarter-wave plate connected to the total reflection element and a second surface of the quarter-wave plate opposite the first surface is connected to the polarizing beam splitter.

31. The optical pickup as claimed in claim 29, wherein the polarizing beam splitter, quarter-wave plate, and the total reflection element are spaced apart from each other.

32. The optical pickup as claimed in claim 29, wherein the first and second light sources emit the respective first and second light beams as linearly polarized with an S-polarization component, the quarter-wave plate phase shifts the second light beam reflected in the second direction so as to change the second light beam into a circularly polarized second light beam, and phase shifts the circularly polarized second light beam after total reflection by the total reflection elements so as to change the circularly polarized second light beam into a linearly polarized light beam having a P-polarization.

33. The optical pickup as claimed in claim 29, wherein the first light beam has a longer wavelength than that of the second light beam.

34. The optical pickup as claimed in claim 26, wherein the photocoupler comprises:
   a total reflection element;
   a quarter-wave plate; and
   a polarizing beam splitter;
   wherein the total reflection element, the quarter-wave plate, and the polarizing beam splitter are positioned in order in the first direction, wherein the polarizing beam splitter reflects the first light beam incident from the first light source in the first direction toward the first type disk via the objective lens and reflects the first light beam emitted from the first type disk toward the first light source, reflects the second light beam reflected from the second light source in the second direction, the quarter-wave plate passes the second light beam reflected in the second direction, the total reflection element totally reflects the second light beam passed in the second direction through the quarter-wave plate back in the first direction, the quarter-wave plate and the polarizing beam splitter passing the totally reflected second light beam in the first direction toward the second type disk, the polarizing beam splitter passes the second light beam reflected from the second type disk in the second direction, the quarter-wave plate passes the second light beam reflected from the second type disk and passed through the polarizing beam splitter in the second direction, the total reflection element totally reflects the second light beam reflected from the second type disk and passed through the quarter-wave plate in the first direction, the quarter-wave plate passes the totally reflected second light beam reflected from the second type disk in the first direction, and the polarizing beam splitter reflects the second light beam reflected by the second type disk, totally reflected by the total reflection element and passed through the quarter-wave plate toward the second light source.

35. The optical pickup as claimed in claim 34, wherein a first surface of the quarter-wave plate connected to the total reflection element and a second surface of the quarter-wave plate opposite the first surface is connected to the polarizing beam splitter.

36. The optical pickup as claimed in claim 34, wherein the polarizing beam splitter, quarter-wave plate, and the total reflection element are spaced apart from each other.

37. The optical pickup as claimed in claim 34, wherein the first and second light sources emit the respective first and second light beams as linearly polarized with an S-polarization component, the quarter-wave plate phase shifts the second light beam reflected in the second direction so as to change the second light beam into a first circularly polarized second light beam, and phase shifts the first circularly polarized second light beam after total reflection by the total reflection elements so as to change the circularly polarized second light beam into a first linearly polarized light beam having a P-polarization, the quarter-wave plate phase shifts the second light beam reflected from the second type disk so as to change the second light beam reflected from the second type disk into a second circularly polarized second light beam, and phase shifts the second circularly polarized second light beam after total reflection by the total reflection elements so as to change the second circularly polarized second light beam into a second linearly polarized light beam having an S-polarization.

38. The optical pickup as claimed in claim 34, wherein the first light beam has a longer wavelength than that of the second light beam.

39. The optical pickup as claimed in claim 26, wherein the first and second light sources face in opposite directions from each other and perpendicular to a surface of the loaded disk.

* * * * *